United States Patent
Yuan

(10) Patent No.: US 10,455,206 B2
(45) Date of Patent: Oct. 22, 2019

(54) METHOD AND DEVICE FOR ADJUSTING WHITE BALANCE AND STORAGE MEDIUM

(71) Applicant: GUANGDONG OPPO MOBILE TELECOMMUNICATIONS CORP., LTD., Dongguan, Guangdong (CN)

(72) Inventor: Quan Yuan, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 0 days.

(21) Appl. No.: 16/018,403

(22) Filed: Jun. 26, 2018

(65) Prior Publication Data

US 2019/0037189 A1   Jan. 31, 2019

(30) Foreign Application Priority Data

Jul. 25, 2017   (CN) .......................... 2017 1 0614382

(51) Int. Cl.
*H04N 9/73* (2006.01)
*H04N 1/60* (2006.01)
(Continued)

(52) U.S. Cl.
CPC .......... *H04N 9/735* (2013.01); *H04N 1/6052* (2013.01); *H04N 1/6077* (2013.01);
(Continued)

(58) Field of Classification Search
CPC .... H04N 9/735; H04N 1/6052; H04N 1/6077; H04N 1/6027; H04N 5/23296; H04N 5/247
See application file for complete search history.

(56) References Cited

U.S. PATENT DOCUMENTS

| 5,808,681 A | * | 9/1998 | Kitajima | ................ | H04N 9/735 348/223.1 |
| 9,686,523 B2 | * | 6/2017 | Kim | ....................... | H04N 9/735 |

(Continued)

FOREIGN PATENT DOCUMENTS

| CN | 101193317 A | 6/2008 |
| CN | 101637019 A | 1/2010 |

(Continued)

OTHER PUBLICATIONS

International Search Report in international application No. PCT/CN2018/095428, dated Oct. 11, 2018.
(Continued)

*Primary Examiner* — Michael E Teitelbaum
(74) *Attorney, Agent, or Firm* — Ladas & Parry, LLP

(57) ABSTRACT

A method and device for adjusting white balance and non-transitory computer readable storage medium are provided. The method is applied to a terminal including at least two cameras of different types and the method includes that whether a present capturing environmental parameter satisfies a first predetermined condition is determined while a first camera of the at least two cameras is performing a capturing operation; responsive to a determination that the present capturing environmental parameter satisfies the first predetermined condition, a second camera of the at least two cameras is pre-started while an image captured by the first camera is being displayed on a display of the terminal; a target white balance gain value corresponding to the second camera is determined according to an image presently captured fey the second camera; and after the second camera is started, the white balance is adjusted on the image captured by the second camera according to the target white balance gain value.

17 Claims, 5 Drawing Sheets

(51) Int. Cl.
    *H04N 5/232*    (2006.01)
    *H04N 5/247*    (2006.01)
(52) U.S. Cl.
    CPC ......... *H04N 5/23296* (2013.01); *H04N 5/247* (2013.01); *H04N 1/6027* (2013.01)

(56) References Cited

U.S. PATENT DOCUMENTS

| | | | |
|---|---|---|---|
| 2005/0122408 A1* | 6/2005 | Park | H04N 9/735 348/223.1 |
| 2008/0218612 A1 | 9/2008 | Border | |
| 2008/0219654 A1 | 9/2008 | Border | |
| 2012/0044372 A1 | 2/2012 | Cote | |
| 2015/0049211 A1* | 2/2015 | Lim | H04N 5/23203 348/211.1 |
| 2017/0085800 A1 | 3/2017 | Wang | |

FOREIGN PATENT DOCUMENTS

| | | |
|---|---|---|
| CN | 104980644 A | 10/2015 |
| CN | 103402102 B | 12/2015 |
| CN | 105208360 A | 12/2015 |
| CN | 105282432 A | 1/2016 |
| CN | 105282451 A | 1/2016 |
| CN | 105744247 A | 7/2016 |
| CN | 105959553 A | 9/2016 |
| CN | 106303258 A | 1/2017 |
| CN | 106385541 A | 2/2017 |
| CN | 107343190 A | 11/2017 |
| WO | 2015141050 A1 | 9/2015 |

OTHER PUBLICATIONS

Written Opinion of the International Search Authority in international application No. PCT/CN2018/095428, dated Oct. 11, 2018.
European Search Report in European application No. 18182344,4, dated Dec. 13, 2018.

* cited by examiner

METHOD AND DEVICE FOR ADJUSTING WHITE BALANCE AND STORAGE MEDIUM

TECHNICAL FIELD

The present disclosure relates to the technical field of photography, and more particularly, to a method and device for adjusting white balance and storage medium.

BACKGROUND

Along with development of sciences and technologies, photographic devices such as cameras and video cameras are widely applied to daily life, and more important roles in people's lives during working and studying of people. When an image is shot by a photographic device, white balance is required to be controlled to ensure real reproduction of a color in an image scenario.

In a related art, when a terminal includes two cameras, the two cameras may be switched according to a capturing environmental parameter. For example, during a zooming operation of switching a zoom ratio from 1× to 2×, a wide-angle lens may be switched to a long-focus lens.

However, when the camera is started at the moment of switching one camera to another camera, there may exist a convergence process for Auto White Balance (AWB). This may bring a color jump at the switching moment and deteriorate user experience.

SUMMARY

In an embodiment of the present disclosure, there is provided a method for adjusting white balance, the method is applied to a terminal includes at least two cameras of different types, and the method includes that: whether a present capturing environmental parameter satisfies a first predetermined condition is determined while a first camera of the at least two cameras is performing a capturing operation; responsive to a determination that the present capturing environmental parameter satisfies the first predetermined condition, a second camera of the at least two cameras is pre-started while a first image captured by the first camera is being displayed on a display of the terminal; a target white balance gain value corresponding to the second camera is determined according to a second image presently captured by the second camera; and after the second camera is started, white balance is adjusted on the second image according to the target white balance gain value; the first predetermined condition according to a type of the second camera is determined before determining whether the present capturing environmental parameter satisfies the first predetermined condition.

In an embodiment of the present disclosure, there is provided a device for adjusting white balance, the device is applied to a terminal includes at least two cameras of different types, and the device includes at least one processor executing computer readable instructions to implement a plurality of modules, which may include a controlling module, a first determination module, an adjusting module and a second determination module. The controlling module is configured to determine whether a present capturing environmental parameter satisfies a first predetermined condition while a first camera of the at least two cameras is performing a capturing operation, and to pre-start a second camera of the at least two cameras while an image captured by the first camera is being displayed on a display of the terminal. The first determination module is configured to determine a target white balance gain value corresponding to the second camera according to an image presently captured by the second camera. The adjusting module is configured to, after the second camera is started, adjust white balance on the image captured by the second camera according to the target white balance gain value. The second determination module is configured to determine the first predetermined condition to a type of the second camera.

In an embodiment of the present disclosure, there is provided a non-transitory computer-readable storage medium having stored thereon a computer program that when executed by a processor, performs the method for adjusting white balance, the method includes that whether a present capturing environmental parameter satisfies a first predetermined condition is determined while a first camera of the at least two cameras is performing a capturing operation; responsive lo a determination that the present capturing environmental parameter satisfies the first predetermined condition, a second camera of the at feast two cameras is pre-started while a first image captured by the first camera is being displayed on a display of the terminal; a target white balance gain value; corresponding to the second camera is determined according to a second image presently captured by the second camera; and after the second camera is started, white balance is adjusted on the second image according to the target white balance gain value; the first predetermined condition according to a type of the second camera is determined before determining whether the present capturing environmental parameter satisfies the first predetermined condition.

Additional aspects and advantages of the disclosure will be partially presented in the following descriptions and partially become apparent from the following descriptions or get understood by implementing the disclosure.

BRIEF DESCRIPTION OF DRAWINGS

The abovementioned and/or additional aspects and advantages of the disclosure will become apparent and easy to understand from the descriptions made below to the embodiments in conjunction with the drawings, in which.

DETAILED DESCRIPTION

Figure 1:
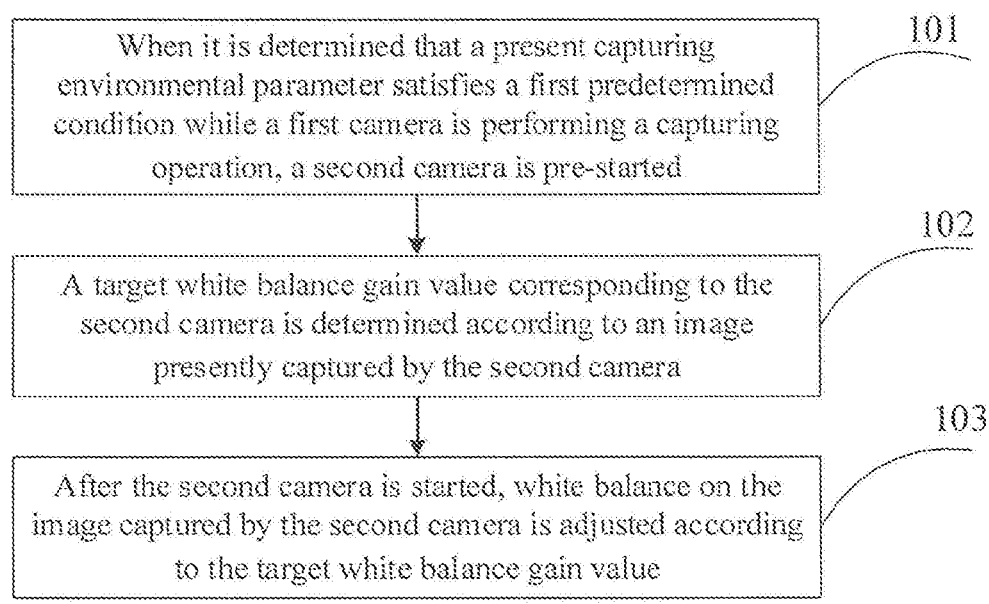
FIG. 1 is a flowchart of a method for adjusting white balance according to an embodiment of the present disclosure.

The embodiments of the disclosure will be described below in detail. Examples of the embodiments are illustrated in the drawings. The same or similar reference signs throughout the drawings represent the same or similar components or components with the same or similar functions. The following embodiments described wish reference The embodiments of the disclosure disclose at least the following technical solutions.

Solution 1. A method for adjusting white balance, the method being applied to a terminal including at least two cameras of different types and the method including: determining whether a present capturing environmental parameter satisfies a first predetermined condition while a first camera off the at least two cameras is performing a capturing operation; responsive to a determination that the present capturing environmental parameter satisfies the first predetermined condition, pre-sorting a second camera of the at least two cameras white an image captured by the first camera is being displayed on a display of the terminal; determining a target white balance gain value corresponding to the second camera according to an image presently captured by the second camera; and after the second camera is started, adjusting the white balance on the image captured by the second camera according to the target white balance gain value.

Solution 2. The method of solution 1, wherein determining whether the present capturing environmental parameter satisfies the first predetermined condition includes at least one of: determining whether a present photographic sensitivity is within a predetermined range for photographic sensitivity; determining whether a present zoom ratio is within a predetermined range for zoom ratio; or determining whether a present object distance is within a predetermined range for object distance.

Solution 3. The method of solution 2, before determining whether the present capturing environmental parameter satisfies the first predetermined condition, further including: determining the first predetermined condition according to a type of the second camera.

Solution 4. The method of solution 3, wherein a zoom ratio of the second camera is ranged from a first zoom ratio to a second zoom ratio, and the first zoom ratio is less than the second zoom ratio; and wherein determining the first predetermined condition according to the type of the second camera includes: while the first camera is performing a capturing operation and the zoom ratio of the terminal is changing from low to high, determining a first predetermined zoom ratio, which is less than the first zoom radio, as the first predetermined condition; and while the first camera is performing a capturing operation and the zoom radio of the terminal is changing from high to low, determining a second predetermined zoom radio, which is larger than the second zoom radio, as the first predetermined condition.

Solution 5. The method of solution 1, wherein determining the target while balance gain value corresponding to the second camera according to the image presently captured by the second camera includes: determining a color temperature value corresponding to the presently captured image by the second camera; and determining the target white balance gain value corresponding to the second camera according to the color temperature value.

Solution 6. The method of solution 4, before adjusting the white balance on the image captured by the second camera according to the target while balance gain value, further including: determining whether the present capturing environmental parameter satisfies a second predetermined condition; and when the present capturing environmental parameter satisfies the second predetermined condition, starting the second camera.

Solution 7. The method of solution 6, before determining whether the present capturing environmental parameter satisfies the second predetermined condition, further including: determining the second predetermined condition according to the type of the second camera.

Solution 8. The method of solution 7, wherein the zoom ratio of the second camera is ranged from a first zoom ratio to a second zoom ratio and the first zoom radio is less than the second zoom ratio, and wherein the method further includes; while the first camera is performing a capturing operation and zooming ratio is changing from low to high, determining a third predetermined zoom ratio which is less than the first zoom ratio as the second predetermined condition, the third predetermined zoom ratio being greater than the first predetermined zoom ratio; and while the first camera is performing a capturing operation and zooming ratio is changing from high to low, determining a fourth predetermined zoom ratio which is larger than the second zoom ratio as the second predetermined condition, the fourth predetermined zoom ratio being less than the second predetermined zoom ratio.

Solution 9. A device for adjusting white balance, the device being applied to a terminal including at least two cameras of different types and the device including: at least one processor executing computer readable instructions to implement a plurality of modules including: a controlling module configured to determine whether a present capturing environmental parameter satisfies a first predetermined condition while a first camera of the at least two cameras is performing a capturing operation, and to pre-start a second camera of the at least two cameras while an image captured by the first camera is being displayed on a display of the terminal; a first determination module configured to determine a target white balance gain value corresponding to the second camera according to an image presently captured by the second camera; and an adjusting module configured to, after the second camera is started, adjust while balance on the image captured by the second camera according to the target white balance gain value.

Solution 10. The device of solution 9, wherein the controlling module is specifically configured to perform at least one of: determining whether present photographic sensitivity is within a predetermined range for photographic sensitivity; determining whether present zoom ratio is within a predetermined range for zoom ratio; or determining whether present object distance is within a predetermined range for object distance.

Solution 11. The device of solution 10, wherein the at least one processor is configured to implement: a second determination module configured to determine the first predetermined condition according to a type of the second camera.

Solution 12. The device of solution 11, a zoom ratio of the second camera is ranged from a first zoom ratio to a second zoom ratio, and the first zoom ratio is less than the second zoom ratio: and wherein the second determination module is configured to: while the first camera is performing a capturing operation and the zoom ratio of the terminal is changing from low to high, determine a first predetermined zoom ratio, which is less than the first zoom radio, as the first predetermined condition; and while the first camera is performing a capturing operation and the zoom radio of the terminal is changing from high to low, determine a second predetermined zoom radio, which is larger than the second zoom radio, as the first predetermined condition.

Solution 13. The device of solution 9, wherein the first determination module is configured to: determine a color temperature value corresponding to the presently captured image by the second camera; and determine the target white balance gain value corresponding to the second camera according to the color temperature value.

Solution 14. The device of solution 12, wherein the second determination module is configured to: before adjusting the white balance on the image captured by the second camera according to the target white balance gain value, determine whether the present capturing environmental parameter satisfies a second predetermined condition; and when the present capturing environmental parameter satisfies the second predetermined condition, start the second camera.

Solution 15. The device of solution 14, wherein the second determination module is configured to, before determining whether the present capturing environmental parameter satisfies the second predetermined condition, determine the second predetermined condition according to the type of the second camera.

Solution 16. The device of solution 15, wherein the zoom ratio of the second camera is ranged from a first zoom ratio to a second zoom ratio, and the first zoom radio is less than the second zoom ratio, and the second determination module is configured to: while the first camera is performing a capturing operation and zooming ratio is changing from low to high, determine a third predetermined zoom ratio which is less than the first zoom ratio as the second predetermined condition, the third predetermined zoom ratio being greater than the first predetermined zoom ratio; and while the first camera is performing a capturing operation and zooming ratio is changing from high to low, determine a fourth predetermined zoom ratio which is larger than the second zoom ratio as the second predetermined condition, the fourth predetermined zoom ratio being less than the second predetermined zoom ratio.

Solution 17. A non-transitory computer-readable storage medium having stored thereon a computer program that when executed by a processor, performs the method for adjusting white balance, the method including: determining a present capturing environmental parameter satisfies a first predetermined condition while a first camera of the at least two cameras is performing a capturing operation; responsive to a determination that the present capturing environmental parameter satisfies the first predetermined condition, pre-starting a second camera of the at least two cameras while an image captured by the first camera is being displayed on a display of the terminal; determining a target white balance gain value corresponding to the second camera according to an image presently captured by the second camera; and after the second camera is started, adjusting the white balance on the image captured by the second camera according to the target white balance gain value.

Solution 18. The non-transitory computer-readable storage medium of solution 17, wherein determining whether the present capturing environmental parameter satisfies the first predetermined condition includes at least one of: determining whether present photographic sensitivity is within a predetermined range for photographic sensitivity; determining whether present zoom ratio is within a predetermined range for zoom ratio; or determining whether present object distance is within a predetermined range for object distance.

Solution 19. The non-transitory computer-readable storage medium of solution 18, further including: before determining whether the present capturing environmental parameter satisfies the first predetermined condition, determining the first predetermined condition according to a type of the second camera.

Solution 20. The non-transitory computer-readable storage medium of solution 19, wherein a zoom ratio of the second camera is ranged from a first zoom ratio to a second zoom ratio, and the first zoom ratio is less than the second zoom ratio; and wherein determining the first predetermined condition according to the type of the second camera includes: while the first camera is performing a capturing operation and the zoom ratio of the terminal is changing from low to high, determining a first predetermined zoom ratio, which is less than the first zoom radio, as the first predetermined condition; and while the first camera is performing a capturing operation and the zoom radio of the terminal is changing from high to low, determining a second predetermined zoom radio, which is larger than the second zoom radio, as the first predetermined condition.

Solution 21. The non-transitory computer-readable storage medium of solution 17, wherein determining the target white balance gain value corresponding to the second camera according to the image presently captured by the second camera includes: determining a color temperature value corresponding to the presently captured image by the second camera; and determining the target white balance gain value corresponding to the second camera according to the color temperature value.

Solution 22. The method of solution 21, further including: before adjusting the white balance on the image captured by the second camera according to the target white balance gain value, determining whether the present capturing environmental parameter satisfies a second predetermined condition; and when the present capturing environmental parameter satisfies the second predetermined condition, starting the second camera.

Solution 23. The non-transitory computer-readable storage medium of solution 22, further including: before determining whether the present capturing environmental parameter satisfies the second predetermined condition, determining the second predetermined condition according to the type of the second camera.

Solution 24. The non-transitory computer-readable storage medium of solution 23, wherein the zoom ratio of the second camera is ranged from a first zoom ratio to a second zoom ratio, and the first zoom radio is less than the second zoom ratio, and wherein the method further includes: while the first camera is performing a capturing operation and zooming ratio is changing from low to high, determining a third predetermined zoom ratio which is less than the first zoom ratio as the second predetermined condition, the third predetermined zoom ratio being greater than the first predetermined zoom ratio; and while the first camera is performing a capturing operation and zooming ratio is changing from high to low, determining a fourth predetermined zoom ratio which is larger than die second zoom ratio as the second predetermined condition, the fourth predetermined zoom ratio being less than the second predetermined zoom ratio.

Solution 25. A terminal equipment, including: a casing, a processor, a memory, a circuit board, a power circuit and at least two cameras of different types, wherein the circuit board is arranged in a space enclosed by the casing, and the processor and the memory are arranged on the circuit board; the power circuit is configured to supply power to each circuit or device of the terminal equipment; the memory is configured to store executable program codes; and the processor reads the executable program codes stored in the memory to run a program corresponding to the executable program codes to execute the method for adjusting white balance of any one of solutions 1-8.

A method, device for controlling white balance, and a terminal equipment of the embodiments of the present disclosure will be described below with reference to the drawings.

For the problem in the related art that, when a terminal includes two cameras and a camera is started at the moment of switching another camera to the camera, there may exist a convergence process for AWB and this may bring a color jump at the switching moment and make a user experience poor, the embodiments of the present disclosure provide a method for adjusting white balance.

According to the method for adjusting white balance provided by the embodiments of the present disclosure, when it is determined that a present capturing environmental parameter satisfies a first predetermined condition while a first camera is performing a capturing operation, a second camera is pre-started, and a target white balance gain value corresponding to the second camera is determined according to a first image presently captured by the second camera. Here, the target white balance gain value is used to adjust the presently captured image (a second image) such that a color in the second image may be really reproduced. As such, white balance on the image captured by the second camera is adjusted according to the target white balance gain value after the second camera is started. In such a manner, the second camera is pre-started before camera switching to complete convergence for AWB in advance, thereby avoiding occurrence of a color jump phenomenon at a camera switching moment and improving a user experience.

The method for adjusting white balance of the embodiments of the present disclosure will be described below in combination with FIG. 1.

FIG. 1 is a flowchart of a method for adjusting white balance according to an embodiment of the present disclosure.

As illustrated in FIG. 1, the method includes the following operations.

In 101, it is determined whether a present capturing environmental parameter satisfies a first predetermined condition while a first camera is performing a capturing operation; and when the present capturing environmental parameter satisfies the first predetermined condition, a second camera is pre-started while the display of the terminal is displaying the first image captured by the first camera.

The method for adjusting white balance provided by the embodiment of the present disclosure may be executed by a device for adjusting white balance provided by an embodiment of the disclosure. Specifically, the device for adjusting white balance may be configured in any terminal equipment with at least two cameras of different types. Here, there are many types of terminal equipments which may be selected according to an application requirement. The terminal equipment may be for example, a mobile phone, a computer, or a camera.

In the embodiment of the present disclosure, the capturing environmental parameter may include one or more of photographic sensitivity, a zoom ratio, an object distance or the like.

The first predetermined condition refers to a pre-starting condition of the second camera and may be set according to a type of the second camera.

That is, before the operation 101, the method may further include that the first predetermined condition is determined according to a type of the second camera.

A capturing environmental parameter suitable for the second camera may be determined according to the type of the second camera and then the first predetermined condition is further determined according to the capturing environmental parameter suitable for the second camera. Therefore, when it is determined that the present capturing environmental parameter satisfies the first predetermined condition while a first camera is performing a capturing operation, the second camera is pre-started.

For example, if the determined capturing environmental parameter suitable for the second camera is a zoom ratio of 2×-4×, according to the capturing environmental parameter, the first predetermined condition may be determined to be that the second camera may be pre-started when the present zoom ratio is changing from low to high and is approximate to 2×, for example, over 1.5×, or the present zoom ratio is changing from high to low and is approximate to 4×, for example, lower than 4.5×.

Similarly, if the determined capturing environmental parameter suitable for the first camera is that a zoom ratio of lower than 2×, when a presently used camera is the second camera and when the zoom ratio is changing from high to low and is approximate to 2×, for example, lower than 2.5×, the first camera may be pre-started.

Correspondingly, the operation 101 may include that whether present photographic sensitivity, zoom ratio and/or object distance are/is in their respective predetermined ranges.

The capturing environmental parameter, such as the photographic sensitivity, the zoom ratio and the object distance, which are suitable for the second camera, may be predetermined according to the type of the second camera included in the terminal. Further, each range corresponding to the present photographic sensitivity, zoom ratio, object distance and the like when the second camera is pre-started is further determined. As such, the second camera may be pre-started when the present photographic sensitivity, zoom ratio and/or object distance are/is in their respective predetermined ranges.

In an exemplary application, if a determined capturing environmental parameter suitable for the first camera includes a zoom ratio which is not greater than 2×, photographic sensitivity of ISO1000-ISO2000, and an object distance which is not greater than 10 meters (m). The capturing environmental parameter suitable for the second camera includes a zoom ratio which is not less than 2×, photographic sensitivity of ISO2000-ISO3000, and an object distance which is not smaller than 19 m. In such case, the second camera is pre-started when the present zoom ratio is changing from low to high and readies 1.5%, the photographic sensitivity is changing from low to high and readies ISO1900, and the object distance is changing from low to high and reaches 9 m. That is, when it is determined that the present zoom ratio is 1.5×, the photographic sensitivity is ISO1900, and the object distance is 9 m while a first camera is performing a capturing operation, the second camera may be pre-started.

It is to be noted that, when it is predetermined that the second camera is pre-started if the present photographic sensitivity, zoom ratio, and object distance are in their respective predetermined ranges, but the present photographic sensitivity, zoom ratio, and object distance may satisfy respective predetermined ranges at different timings. For example, when the present zoom ratio is 1.5×, the photographic sensitivity may be ISO1800 and the object distance may be 8 m. When the photographic sensitivity is ISO1900. the zoom ratio may have reached 1.6× and the object distance may have reached 10 m. Thus, in the embodiment of the present disclosure, when the second camera is pre-started, the present capturing environmental parameter might not reach the zoom ratio of 1.5×, the photographic sensitivity of ISO1800, and the object distance of 8 m. Instead, the second camera is pre-started when the present zoom ratio is 1.6×, the photographic sensitivity is ISO1900, and the object distance is 10 m.

In 102, a target white balance gain value corresponding to the second camera is determined according to an image presently captured by the second camera.

It can be understood that after the second camera is pre-started, a second image may be acquired, so that the target white balance gain value corresponding to the second camera may be determined according to the second image presently captured by the second camera.

Here, the target white balance gain value is configured to adjust the presently captured image such that a color in the image may be really reproduced.

Specifically, the target white balance gain value may include target while balance gain values of three channels Red (Red), Green (G) and Blue (B) in a second image acquired by an image sensor.

In a specific implementation, the operation 102 may be implemented in the following manner.

In 102a, a color temperature value corresponding to the presently captured second image is determined.

The color temperature value corresponding to the presently captured image may be determined by many methods.

For example, the color temperature value corresponding to the presently captured second image may be determined according to a color temperature value corresponding to the respective white blocks in the image presently captured by the second camera. Alternatively, die color temperature value corresponding to the presently captured second image may be determined according to a color temperature value corresponding to a region where a target shooting object is located in the presently captured image. Other suitable methods may be adopted.

In 102b, the target white balance gain value corresponding to the second camera is determined according to the color temperature value.

After the color temperature value corresponding to the presently captured image is obtained, a color cast direction of the image may be determined, thereby calculating the target white balance gain value.

As a possible implementation, when the color in the second image has a sufficient color change, mean values of three components R, G and B in color components of all pixels tend to be balanced (1:1:1), and a more accurate target while balance gain value may be obtained by adopting a weighted gray algorithm.

The presently captured second image is divided into a plurality of sub-blocks, the color components of all the pixels in each sub-block are acquired. Each pixel is represented by an (R, G, B) color vector. Then, a mean value and standard deviation of three channels R, G and B in each sub-block are calculated. The standard deviation of each sub-block is weighted (the sub-blocks with low correlations are discarded and the sub-blocks with high correlations are reserved) to reduce influence of single colors of large blocks to make the image rich in color. The mean values of the three channels R, G and B of which the standard deviations are weighted are further calculated, and gain coefficients of the three channels R, G and B are finally calculated, that is, the target white balance gain values are obtained.

In 103, after the second camera is started, white balance on the second image captured by the second camera is adjusted according to the target white balance gain value.

The target white balance gain value corresponding to the second camera is determined according to the image acquired after the second camera is pre-started. Then, after the second camera is started, the adjusted R value and B value data of each pixel may be calculated according to the calculated target white balance gain value, thereby implementing color correction. Since the second camera has been pre-started before the first camera is switched to the second camera, and the target white balance gain value corresponding to the second camera has been obtained according to the image presently captured by the second camera, convergence for AWB may be completed in advance and occurrence of a color jump phenomenon after the second camera is started may be avoided.

It is to be noted that since human eyes are most sensitive to light belonging to G light wavelengths (480 nm-600 nm) in a spectrum and a number of G pixels acquired in a Bayer array is largest, a present camera usually adopts a constant gain value of a G component, and then adjusts gain values of an R component and a B component to implement regulation of the R component and the B component.

It is to be noted that in the embodiment of the present disclosure, after the second camera is pre-started and before the second camera is started, an image displayed in the terminal is only an image acquired by the first camera and the second image captured by the second camera will not influence display of the image in the terminal.

According to the method for adjusting white balance provided by the embodiment of the present disclosure, when it is determined that the present capturing environmental parameter satisfies the first predetermined condition while a first camera is performing a capturing operation, the second camera is pre-started. Then, the target white balance gain value corresponding to the second camera is determined according to the image presently captured by the second camera, thereby adjusting the white balance on the image captured by the second camera according to the target white balance gain value alter the second camera is started. In such a manner, the second camera is pre-started before camera switching to complete convergence for AWB in advance, thereby avoiding occurrence of a color jump phenomenon at a camera switching moment and improving a user experience.

From the above analysis, it can be seen that the second pre-started when the present capturing environmental parameter satisfies the first predetermined condition while a first camera is performing a capturing operation and the target while balance gain value corresponding to the second camera may be determined according to the image presently captured by the second camera, thereby adjusting the white balance on the image captured by the second camera according to the target white balance gain value after the second camera is started. During a practical application, the condition which the present capturing environmental parameter is required to satisfy when the second camera is started may further be preset, so that the second camera may be started when the present capturing environmental parameter satisfies the predetermined condition. The abovementioned condition will specifically be described below with reference to FIG. 2.

Figure 2:
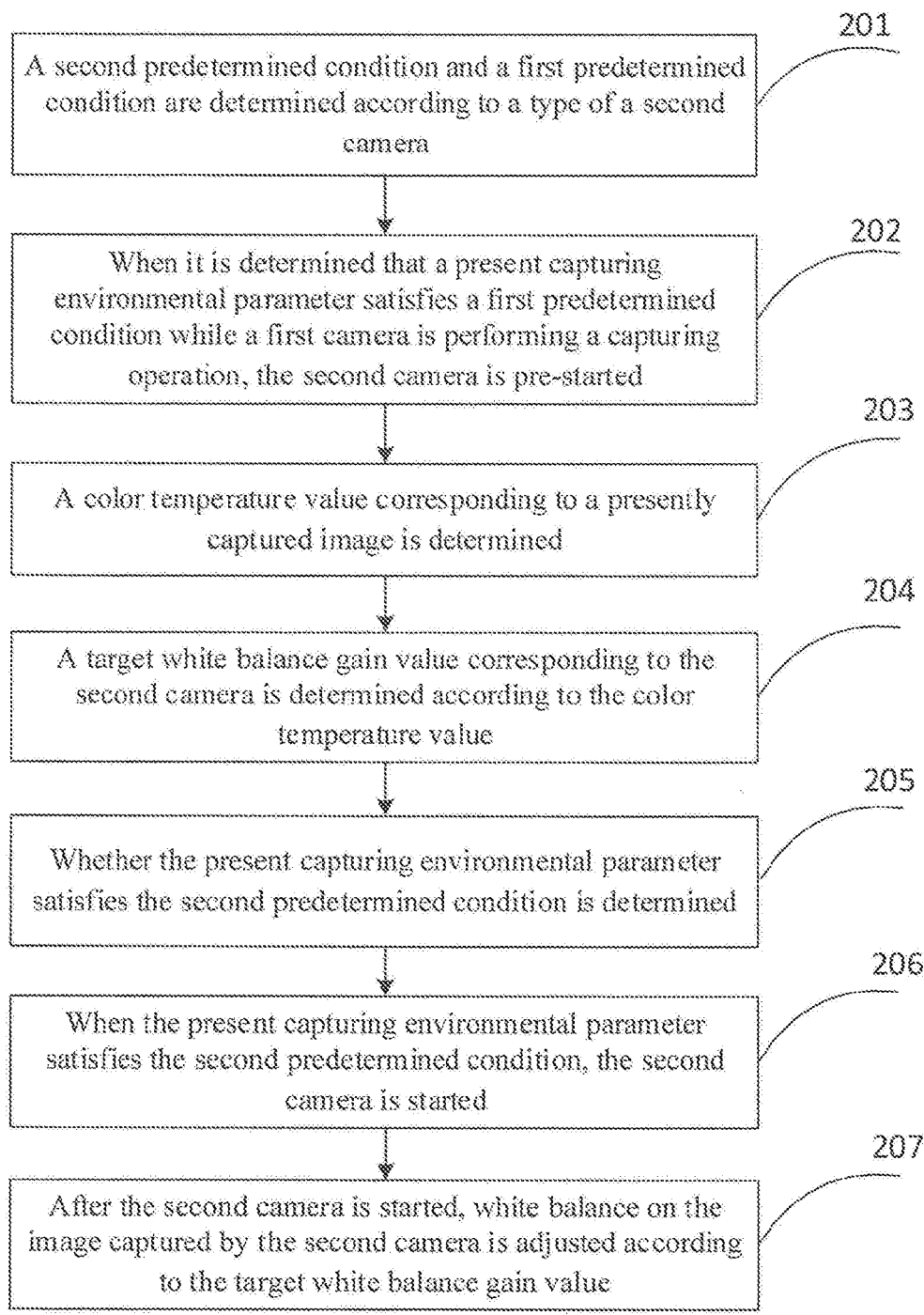
FIG. 2 is a flowchart of a method for adjusting white balance according to another embodiment of the present disclosure.

FIG. 2 is a flowchart of a method tor adjusting white balance according to another embodiment of the present disclosure.

As illustrated in FIG. 2, the method for adjusting white balance is applied to a terminal including at least two cameras of different types. The method includes the following operations.

In 201, a second predetermined condition and a first predetermined condition are determined according to a type of a second camera.

Here, the second predetermined condition refers to a starting condition of the second camera and may be determined according to the type of the second camera.

The first predetermined condition refers to a pre-starting condition of the second camera and may be set according to the type of the second camera.

In 202, when it is determined that a present capturing environmental parameter satisfies the first predetermined condition while a first camera is performing a capturing operation, the second camera is pre-started.

In 203, a color temperature value corresponding to a presently captured image is determined.

In 204, a target white balance gain value corresponding to the second camera is determined according to the color temperature value.

In 205, whether the present capturing environmental parameter satisfies the second predetermined condition is determined.

In 206, when the present capturing environmental parameter satisfies the second predetermined condition, the second camera is started.

In 207, after the second camera is started, white balance on the image captured by the second camera is adjusted according to the target white balance gain value.

Here, specific implementation processes and principles of 201-207 may refer to related descriptions about 101-103 in the above-mentioned embodiment and will not be elaborated herein.

A capturing environmental parameter suitable for the second camera may be determined according to the type of the second camera, and then the second predetermined condition and the first predetermined condition are further determined according to the capturing environmental parameter suitable for the second camera. Therefore, when it is determined that the present capturing environmental parameter satisfies the first predetermined condition, the second camera is pre-started, and when it is determined that the present capturing environmental parameter satisfies the second predetermined condition, the second camera is started.

In an exemplary application, when the determined capturing environmental parameter suitable for the second camera is a zoom ratio of over 2x, according to the capturing environmental parameter. The first predetermined condition may be determined to be that the second camera is pre-started when the present zoom ratio is changing from low to high and is approximate to 2x, for example, over 1.5x, and the second predetermined condition is that the second camera may be started when the present zoom ratio is changing from high to low and is approximate to 2x, for example, over 1.9x, or equal to 2x.

After the first predetermined condition and the second predetermined condition are determined, the second camera may be pre-started when the present capturing environmental parameter satisfies the first predetermined condition, the target white balance gain value corresponding to the second camera may be determined according to the image presently captured by the second camera, the second camera is started when the present capturing environmental parameter satisfies the second predetermined condition, and white balance on the second image captured by the second camera is adjusted according to the obtained target white balance gain value.

According to the method for adjusting white balance provided by the embodiment of the present disclosure, the second predetermined condition and the first predetermined condition are determined according to the type of the second camera. Then, when it is determined that the present capturing environmental parameter satisfies the first predetermined condition while a first camera is performing a capturing operation, the second camera is pre-started. The color temperature value corresponding to the presently captured image is determined, the target white balance gain value corresponding to the second camera is determined according to the color temperature value. Whether the present capturing environmental parameter satisfies the second predetermined condition is determined. When the present capturing environmental parameter satisfies the second predetermined condition, the second camera is started, and after the second camera is started, white balance regulation is finally performed on the image captured by the second camera according to the target white balance gain value. In such a manner, the second camera is pre-started before camera switching to complete convergence for AWB in advance, thereby avoiding occurrence of a color jump phenomenon at a camera switching moment and improving a user experience.

Figure 3:
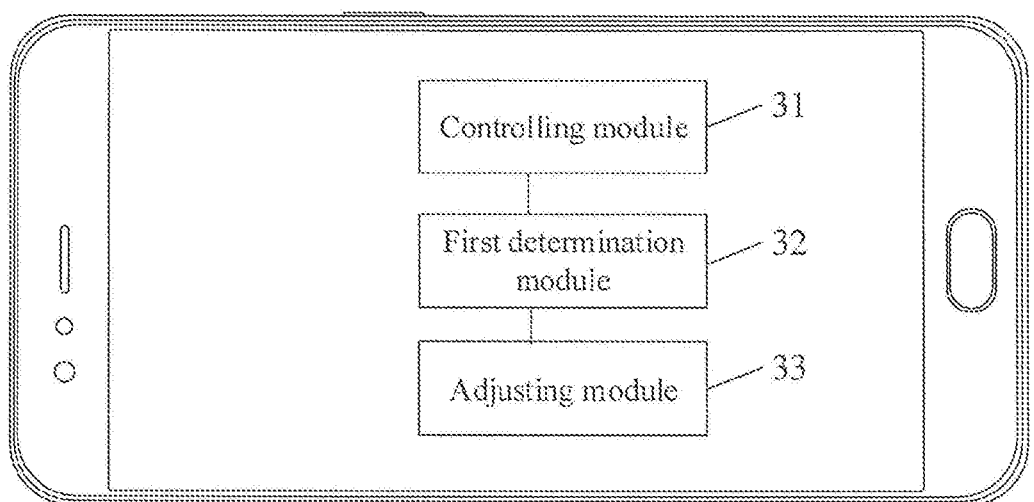
FIG. 3 is a diagram illustrating a configuration of a device for adjusting white balance according to an embodiment of the present disclosure.

FIG. 3 is a diagram illustrating a configuration of a device for adjusting white balance according to an embodiment of the disclosure.

As illustrated in FIG. 3, the device for adjusting white balance is applied to a terminal including at least two cameras of different types. The device includes a controlling module 31, a first determination module 32, and an adjusting module 33.

The controlling module 31 is configured to determine whether a present capturing environmental parameter satisfies a first predetermined condition while a first camera is performing a capturing operation; and when the present capturing environmental parameter satisfies the first predetermined condition, pre-start a second camera while the display of the terminal is displaying the image captured by the first camera.

The first determination module 32 is configured to determine a target white balance gain value corresponding to the second camera according to an image presently captured by the second camera.

The adjusting module 33 is configured to, after the second camera is started, adjust white balance on the image captured by the second camera according to the target white balance gain value.

Here, the device for adjusting white balance provided by the embodiment may execute a method for adjusting white balance provided by the embodiments of the disclosure. The device for adjusting white balance may be configured in any terminal equipment with at least two cameras of different types. Here, there are many types of terminal equipment which may be selected according to an application requirement. For example, the terminal equipment may be a mobile phone, a computer, or a camera.

In a possible implementation of the embodiment, the controlling module 31 is specifically configured to determine whether present photographic sensitivity, zoom ratio and/or object distance are/is in their respective predetermined ranges.

In another possible implementation of the embodiment, the first determination module 32 is specifically configured to determine a color temperature value corresponding to the presently captured image; and determine the target white balance gain value corresponding to the second camera according to the color temperature value.

It is to be noted that the illustration and descriptions about the embodiment of the method for adjusting white balance in the above mentioned embodiment may also apply to the device for adjusting white balance of the embodiment and will not be elaborated herein.

According to the device for adjusting white balance provided by the embodiment of the disclosure, when it is determined that the present capturing environmental parameter satisfies the first predetermined condition while a first camera is performing a capturing operation, the second camera is pre-started. Then, the target white balance gain value corresponding to the second camera is determined according to the image presently captured by the second camera, thereby adjusting the white balance on the image captured by the second camera according to the target white balance gain value after the second camera is started. In such a manner, the second camera is pre-started before camera switching to complete convergence for AWB in advance, thereby avoiding occurrence of a color jump phenomenon at a camera switching moment and improving a user experience.

Figure 4:
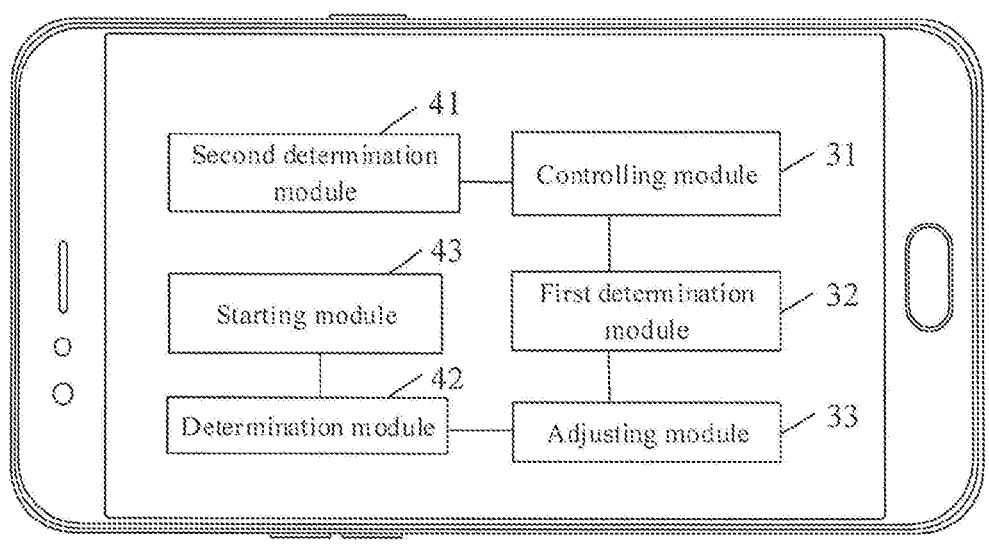
FIG. 4 is a diagram illustrating a configuration of a device for adjusting white balance according to another embodiment of the present disclosure.

FIG. 4 is a diagram illustrating a configuration of a device for adjusting white balance according to another embodiment of the disclosure.

As illustrated in FIG. 4, on the basis of FIG. 3, the device for adjusting white balance further includes a second determination module 41, a judgement module 42 and a starting module 43.

The second determination module 41 is configured to determine the first predetermined condition according to a type of the second camera.

The judgment module 42 is configured to determine whether the present capturing environmental parameter satisfies the second predetermined condition.

The starting module 43 is configured to, when the present capturing environmental parameter satisfies the second predetermined condition, start the second camera.

It is to be noted that the illustrations and descriptions about the method for adjusting white balance embodiment in the abovementioned embodiment are also applied to the device for adjusting white balance of the embodiment and will not be elaborated herein.

According to the device for adjusting white balance provided by the embodiment of the disclosure, when it is determined that the present capturing environmental parameter satisfies the first predetermined condition while a first camera is performing a capturing operation, the second camera is pre-started. Then, the target white balance gain value corresponding to the second camera is determined according to the image presently captured by the second camera, thereby adjusting the while balance on the image captured by the second camera according to the target while balance gain value after the second camera is started. In such a manner, the second camera is pre-started before camera switching to complete convergence for AWB in advance, thereby avoiding occurrence of the color jump phenomenon at the camera switching moment and improving the user experience.

In another aspect of the disclosure, the embodiments further disclose a terminal equipment.

Figure 5:
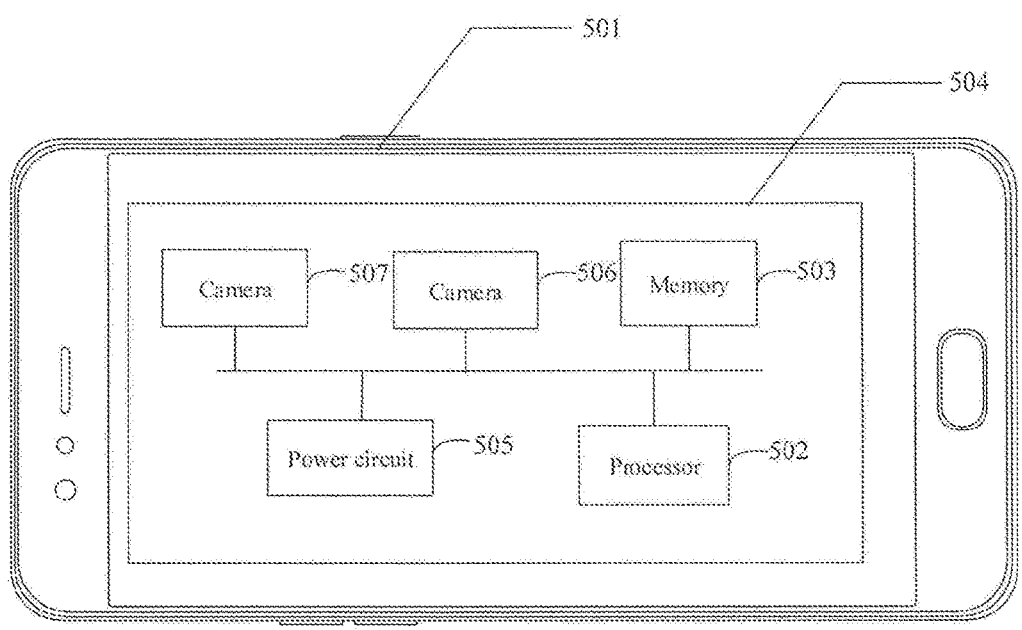
FIG. 5 is a diagram illustrating a configuration of a terminal equipment according to an embodiment of the present disclosure.

FIG. 5 is a diagram illustrating a configuration of terminal equipment according to an embodiment of the disclosure.

Here, there are many types of terminal equipment which may be selected according to an application requirement. The terminal equipment may be for example, a mobile phone, a computer, or a camera. The terminal equipment in FIG. 5 is schematically a mobile phone.

As illustrated in FIG. 5, the terminal equipment includes a casing 501, a processor 502, a memory 503, a circuit board 504, a power circuit 505 and at feast two cameras of different types. In FIG. 5, two cameras 506 and 507 are included for illustration.

Here, the circuit board 504 is arranged in a space enclosed by the casing 501. The processor 502 and the memory 503 are arranged on the circuit board 504. The power circuit 505 is configured to supply power to each circuit or device of the terminal equipment. The memory 503 is configured to store an executable program code. The processor 502 reads the executable program codes stored in the memory 503 to run a program corresponding to the executable program codes to execute the method for adjusting white balance in the abovementioned embodiment.

It is to be noted that the abovementioned illustrations and descriptions about the method for adjusting white balance embodiment are also applied to the terminal equipment of the embodiment and an implementation principle is similar and will not be elaborated herein.

The terminal equipment provided by the embodiment of the present disclosure, when it is determined that a present capturing environmental parameter satisfies a first predetermined condition while a first camera is performing a capturing operation, pre-starts a second camera. A target white balance gain value corresponding to the second camera is determined according to an image presently captured by the second camera, thereby adjusting the white balance on the image captured by the second camera according to the target white balance gain value after the second camera is started. In such a manner, the second camera is pre-started before camera switching to complete convergence for AWB in advance, thereby avoiding occurrence of a color jump phenomenon at a camera switching moment and improving a user experience.

To achieve the purposes, an embodiment of the present disclosure discloses a computer-readable storage medium having stored thereon a computer program that when executed by a processor, performs a method for adjusting white balance in the abovementioned embodiment.

The computer-readable storage medium provided by the embodiment of the disclosure may be arranged in any terminal equipment including at least two cameras Of different types and with a white balance regulation requirement, and when white balance is adjusted, the method for adjusting white balance stored thereon may be executed to implement pre-starting of a second camera before camera switching to complete convergence for AWB in advance, thereby avoiding occurrence of a color jump phenomenon at a camera switching moment and improving a user experience.

To achieve the purposes, an embodiment of the disclosure discloses a computer program product, an instruction in the computer program product being executed by a processor to execute a method for adjusting white balance in the abovementioned embodiment.

The computer program product provided by the embodiment of the disclosure may be arranged in any terminal equipment including at least two cameras of different types and with a white balance regulation requirement, and when white balance is adjusted, a program corresponding to the method for adjusting while balance may be executed to implement pre-starting of a second camera before camera switching to complete convergence for AWB in advance, thereby avoiding occurrence of a color jump phenomenon at a camera switching moment and improving a user experience.

It is to be noted that in the disclosure, relationship terms such as first and second are only adopted to distinguish an entity or operation from another entity or operation and do not always require or imply existence of any practical relationship or sequence between these entities or operations. Moreover, terms "include" and "contain" or any other variant thereof is intended to cover nonexclusive inclusions, so that a process, method, object or equipment including a series of elements not only includes those elements but also includes oilier elements which are not clearly listed or further includes elements intrinsic to the process, the method, the object or the equipment. Under the circumstance of no more restrictions, an element limited by a statement "including a/an . . . " does not exclude existence of the same other element in a process, method, object or equipment including the element.

Logics and/or operations presented in the flowcharts or described in other manners herein, for example, may be considered as a fixed sequence table of the executable instructions configured to implement the logic functions, and may specifically be implemented in any computer-readable medium for an instruction execution system, device or equipment (for example, a computer-based system, a system including a processor or other system capable of reading an instruction from the instruction execution system, device or equipment and executing the instruction) to use or for use in combination with the instruction execution system, device or equipment. For this specification, the "computer-readable medium" may be any device capable of including, storing, communicating with, propagating or transmitting it program for the instruction execution system, device or equipment to use or for use in combination with the instruction execution system, device or equipment. A more specific example (non-exhaustive list) of the computer-readable medium includes: an electric connection part (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read -Only Memory (CD-ROM). In addition, the computer-readable medium may even be paper on which the program may be printed or another proper medium because the program may be obtained in an electronic manner by, for example, performing optical scanning on the paper or the other medium and then performing edition and explanation or adopting another proper manner when necessary and then is stored in a computer memory.

It should be understood that each part of the disclosure may be implemented by hardware, software, firmware or a combination thereof. In the abovementioned implementations, multiple operations or methods may be implemented by software or firmware stored in the memory and executed by a proper instruction execution system. For example, in case of implementation with hardware, like another implementation, any one of the following well-known technologies in this art or a combination thereof may be adopted for implementation: a discrete logic circuit with a logic gate circuit configured to realize a logic function on a data signal, an application specific integrated circuit with a proper combined logic gate circuit, a Programmable Gate Array (PGA), a Field-Programmable Gate Array (FPGA) and the like.

It is to be noted that in the descriptions of the specification, descriptions with reference to terms "an embodiment", "some embodiments", "example", "specific example", "some examples" or the like refer to that specific characteristics, structures, materials or features described in combination with the embodiment or the example are included in at least one embodiment or example of the disclosure. In the specification, schematic expressions about the terms are not always for the same embodiment or example. In addition, specific described characteristics, structures, materials or features may be combined in one or more embodiments or examples in a proper manner. Moreover, those skilled in the art may combine and integrate different embodiments or examples described in the specification and characteristics of different embodiments or examples without conflicts.

In the descriptions of the specification, descriptions with reference to terms "an embodiment", "some embodiments", "example", "specific example", "some examples" or the like refer to that specific characteristics, structures, materials or features described in combination with the embodiment or the example are included in at least one embodiment or example of the disclosure. In the specification, schematic expressions about the terms are not always for the same embodiment or example. In addition, specific described characteristics, structures, materials or features may be combined in one or more embodiments or examples in a proper manner. Moreover, those skilled in the art may combine arid integrate different embodiments or examples described in the specification and characteristics of different embodiments or examples without conflicts.

Although the embodiments of the disclosure have been illustrated or described above, it can be understood that the embodiments are exemplary and should not be understood as limits to the disclosure and those of ordinary skilled in the art may make variations, modifications, replacements and transformations to the embodiments within the scope of the disclosure.

The invention claimed is:

1. A method for adjusting white balance, the method being applied to a terminal comprising at least two cameras of different types, and the method comprising:
    determining whether a present capturing environmental parameter satisfies a first predetermined condition while a first camera of the at least two cameras is performing a capturing operation;
    responsive to a determination that the present capturing environmental parameter satisfies the first predetermined condition, pre-starting a second camera of the at least two cameras while an image captured by the first camera is being displayed on a display of the terminal;
    determining a target white balance gain value corresponding to the second camera according to an image presently captured by the second camera; and
    after the second camera is started, adjusting the white balance on the image captured by the second camera according to the target white balance gain value;
    the method further comprising: before determining whether the present capturing environmental parameter satisfies the first predetermined condition, determining the first predetermined condition according to a type of the second camera.

2. The method as claimed in claim 1, wherein determining whether the present capturing environmental parameter satisfies the first predetermined condition comprises at least one of:
    determining whether a present photographic sensitivity is within a predetermined range for photographic sensitivity;
    determining whether a present zoom ratio is within a predetermined range for zoom ratio; or determining whether a present object distance is within a predetermined range for object distance.

3. The method as claimed in claim 1, wherein a zoom ratio of the second camera is ranged from a first zoom ratio to a second zoom ratio, and the first zoom ratio is less than the second zoom ratio;
determining the first predetermined condition according to the type of the second camera comprises:
when the first camera is performing a capturing operation and the zoom ratio of the terminal is changing from low to high, determining a first predetermined zoom ratio, which is less than the first zoom radio, as the first predetermined condition; and
when the first camera is performing a capturing operation and the zoom radio of the terminal is changing from high to low, determining a second predetermined zoom radio, which is larger than the second zoom radio, as the first predetermined condition.

4. The method as claimed in claim 1, wherein determining the target white balance gain value corresponding to the second camera according to the image presently captured by the second camera comprises:
determining a color temperature value corresponding to the presently captured image by the second camera; and
determining the target white balance gain value corresponding to the second camera according to the color temperature value.

5. The method as claimed claim 3, before adjusting the white balance on the image captured by the second camera according to the target white balance gain value, further comprising:
determining whether the present capturing environmental parameter satisfies a second predetermined condition; and
when the present capturing environmental parameter satisfies the second predetermined condition, starting the second camera.

6. The method as claimed in claim 5, before determining whether the present capturing environmental parameter satisfies the second predetermined condition, further comprising:
determining the second predetermined condition according to the type of the second camera.

7. The method as claimed in claim 6, wherein the zoom ratio of the second camera is ranged from a first zoom ratio to a second zoom ratio, and the first zoom radio is less than the second zoom ratio, and wherein the method further comprises:
when the first camera is performing a capturing operation and zooming ratio is changing from low to high, determining a third predetermined zoom ratio which is less than the first zoom ratio as the second predetermined condition, the third predetermined zoom ratio being greater than the first predetermined zoom ratio; and
when the first camera is performing a capturing operation and zooming ratio is changing from high to low, determining a fourth predetermined zoom ratio which is larger than the second zoom ratio as the second predetermined condition, the fourth predetermined zoom ratio being less than the second predetermined zoom ratio.

8. A device for adjusting white balance, the device being applied to a terminal comprising at least two cameras of different types and the device comprising:
at least one processor executing computer readable instructions to implement a plurality of modules comprising:
a controlling module configured to determine whether a present capturing environmental parameter satisfies a first predetermined condition while a first camera of the at least two cameras is performing a capturing operation, and to pre-start a second camera of the at least two cameras while an image captured by the first camera is being displayed on a display of the terminal;
a first determination module configured to determine a target white balance gain value corresponding to the second camera according to an image presently captured by the second camera;
an adjusting module configured to, after the second camera is started, adjust white balance on the image captured by the second camera according to the target white balance gain value; and
a second determination module configured to determine the first predetermined condition according to a type of the second camera.

9. The device as claimed in claim 8, wherein the controlling module is specifically configured to perform at least one of:
determining whether present photographic sensitivity is within a predetermined range for photographic sensitivity;
determining whether present zoom ratio is within a predetermined range for zoom ratio; or
determining whether present object distance is within a predetermined range for object distance.

10. The device as claimed in claim 8, a zoom ratio of the second camera is ranged from a first zoom ratio to a second zoom ratio, and the first zoom ratio is less than the second zoom ratio;
and wherein the second determination module is configured to:
when the first camera is performing a capturing operation and the zoom ratio of the terminal is changing from low to high, determine a first predetermined zoom ratio, which is less than the first zoom radio, as the first predetermined condition; and
when the first camera is performing a capturing operation and the zoom radio of the terminal is changing from high to low, determine a second predetermined zoom radio, which is larger than the second zoom radio, as the first predetermined condition.

11. The device as claimed in claim 8, wherein the first determination module is configured to:
determine a color temperature value corresponding to the presently captured image by the second camera; and
determine the target white balance gain value corresponding to the second camera according to the color temperature value.

12. The device as claimed in claim 10, wherein the second determination module is configured to:
before adjusting the white balance on the image captured by the second camera according to the target white balance gain value, determine whether the present capturing environmental parameter satisfies a second predetermined condition; and
when the present capturing environmental parameter satisfies the second predetermined condition, start the second camera.

13. The device as claimed in claim 12, wherein the second determination module is configured to, before determining whether the present capturing environmental parameter satisfies the second predetermined condition, determine the second predetermined condition according to the type of the second camera.

14. The device as claimed in claim 13, wherein the zoom ratio of the second camera is ranged from a first zoom ratio to a second zoom ratio, and the first zoom radio is less than the second zoom ratio, and the second determination module is configured to:
when the first camera is performing a capturing operation and zooming ratio is changing from low to high, determine a third predetermined zoom ratio which is less than the first zoom ratio as the second predetermined condition, the third predetermined zoom ratio being greater than the first predetermined zoom ratio; and
when the first camera is performing a capturing operation and zooming ratio is changing from high to low, determine a fourth predetermined zoom ratio which is larger than the second zoom ratio as the second predetermined condition, the fourth predetermined zoom ratio being less than the second predetermined zoom ratio.

15. A non-transitory computer-readable storage medium having stored thereon a computer program that when executed by a processor, performs the method for adjusting white balance, the method comprising: determining whether a present capturing environmental parameter satisfies a first predetermined condition while a first camera of the at least two cameras is performing a capturing operation;
responsive to a determination that the present capturing environmental parameter satisfies the first predetermined condition, pre-starting a second camera of the at least two cameras while an image captured by the first camera is being displayed on a display of the terminal;
determining a target white balance gain value corresponding to the second camera according to an image presently captured by the second camera; and after the second camera is started, adjusting the white balance on the image captured by the second camera according to the target white balance gain value;
the method further comprising: before determining whether the present capturing environmental parameter satisfies the first predetermined condition, determining the first predetermined condition according to a type of the second camera.

16. The non-transitory computer-readable storage medium as claimed in claim 15, wherein determining whether the present capturing environmental parameter satisfies the first predetermined condition comprises at least one of:
determining whether present photographic sensitivity is within a predetermined range for photographic sensitivity;
determining whether present zoom ratio is within a predetermined range for zoom ratio; or
determining whether present object distance is within a predetermined range for object distance.

17. The non-transitory computer-readable storage medium as claimed in claim 15, wherein a zoom ratio of the second camera is ranged from a first zoom ratio to a second zoom ratio, and the first zoom ratio is less than the second zoom ratio;
and wherein determining the first predetermined condition according to the type of the second camera comprises:
when the first camera is performing a capturing operation and the zoom ratio of the terminal is changing from low to high, determining a first predetermined zoom ratio, which is less than the first zoom radio, as the first predetermined condition; and
when the first camera is performing a capturing operation and the zoom radio of the terminal is changing from high to low, determining a second predetermined zoom radio, which is larger than the second zoom radio, as the first predetermined condition.

* * * * *